(12) United States Patent
Chen et al.

(10) Patent No.: US 11,574,406 B2
(45) Date of Patent: Feb. 7, 2023

(54) SYSTEMS AND METHODS FOR IMAGE SEGMENTATION USING A SCALABLE AND COMPACT CONVOLUTIONAL NEURAL NETWORK

(71) Applicant: Keya Medical Technology Co., Ltd., Beijing (CN)

(72) Inventors: Hanbo Chen, Seattle, WA (US); Shanhui Sun, Princeton, NJ (US); Youbing Yin, Kenmore, WA (US); Qi Song, Seattle, WA (US)

(73) Assignee: KEYA MEDICAL TECHNOLOGY CO., LTD., Beijing (CN)

( * ) Notice: Subject to any disclaimer, the term of this patent is extended or adjusted under 35 U.S.C. 154(b) by 240 days.

(21) Appl. No.: 16/997,754

(22) Filed: Aug. 19, 2020

(65) Prior Publication Data

US 2020/0380689 A1 Dec. 3, 2020

Related U.S. Application Data

(63) Continuation of application No. 16/159,573, filed on Oct. 12, 2018, now Pat. No. 10,783,640.

(Continued)

(51) Int. Cl.
*G06T 7/11* (2017.01)
*G06T 7/136* (2017.01)
(Continued)

(52) U.S. Cl.
CPC .................. *G06T 7/11* (2017.01); *G06N 3/08* (2013.01); *G06T 7/12* (2017.01); *G06T 7/136* (2017.01);
(Continued)

(58) Field of Classification Search
CPC ........ G06N 3/0454; G06N 3/08; G06N 3/084; G06T 2207/20081; G06T 2207/20084;
(Continued)

(56) References Cited

U.S. PATENT DOCUMENTS 10,062,014 B2 8/2018 Zhou et al.
10,558,893 B2 * 2/2020 Bluche ................. G06V 30/373
(Continued)

OTHER PUBLICATIONS

First Office action issued in related Chinese Application No. 201811268094.5, dated Mar. 30, 2020, 10 pages.
(Continued)

*Primary Examiner* — Tsung Yin Tsai
(74) *Attorney, Agent, or Firm* — Bayes PLLC (57) ABSTRACT

Embodiments of the disclosure provide systems and methods for segmenting an image. An exemplary system includes a communication interface configured to receive the image acquired by an image acquisition device. The system further includes a memory configured to store a multi-level learning network comprising a plurality of convolution blocks cascaded at multiple levels. The system also includes a processor configured to apply a first convolution block and a second convolution block of the multi-level learning network to the image in series. The first convolution block is applied to the image and the second convolution block is applied to a first output of the first convolution block. The processor is further configured to concatenate the first output of the first convolution block and a second output of the second convolution block to obtain a feature map and obtain a segmented image based on the feature map.

18 Claims, 7 Drawing Sheets

Related U.S. Application Data (60) Provisional application No. 62/578,907, filed on Oct. 30, 2017.

(51) Int. Cl.
*G06N 3/08* (2006.01)
*G06T 7/12* (2017.01)

(52) U.S. Cl.
CPC .............. *G06T 2207/20081* (2013.01); *G06T 2207/20084* (2013.01); *G06T 2207/30004* (2013.01)

(58) Field of Classification Search
CPC ... G06T 2207/30004; G06T 7/11; G06T 7/12; G06T 7/136; G06V 10/82
See application file for complete search history.

(56) References Cited

U.S. PATENT DOCUMENTS

| | | | |
|---|---|---|---|
| 10,600,184 B2 | 3/2020 | Golden et al. | |
| 11,164,067 B2 * | 11/2021 | Liang | G06V 10/764 |
| 2017/0046616 A1 | 2/2017 | Socher et al. | |
| 2017/0258433 A1 * | 9/2017 | Gulsun | G06T 11/206 |
| 2017/0270653 A1 | 9/2017 | Garnavi et al. | |
| 2017/0286773 A1 * | 10/2017 | Skaff | H04N 5/23238 |
| 2018/0108139 A1 | 4/2018 | Abramoff et al. | |
| 2018/0137343 A1 * | 5/2018 | Liu | G06V 40/169 |
| 2018/0259608 A1 * | 9/2018 | Golden | G06N 3/02 |
| 2018/0260956 A1 | 9/2018 | Huang et al. | |
| 2019/0012802 A1 * | 1/2019 | Liu | G06V 20/70 |
| 2019/0102878 A1 * | 4/2019 | Zhang | G06N 3/0454 |
| 2019/0236411 A1 | 8/2019 | Zhu et al. | |
| 2019/0279035 A1 * | 9/2019 | Bluche | G06V 30/18057 |
| 2019/0294928 A1 * | 9/2019 | Zhang | G06V 10/82 |
| 2020/0074271 A1 * | 3/2020 | Liang | G06N 3/0454 |
| 2020/0151546 A1 * | 5/2020 | Liu | G06V 30/194 |
| 2020/0380695 A1 * | 12/2020 | Zhou | G06T 7/143 |

OTHER PUBLICATIONS

"Feature Pyramid Networks for Object Detection", Tsung-YiLin, et al. «arXiv: 1612. 03144v2[cs.CV]», Apr. 19, 2017, 10 pages.

"DeepLab: Semantic Image Segmentation with Deep Convolutional Nets, Atrous Convolution, and Fully Connected CRFs", Liang-Chieh Chen et al. «arXiv: 1606. 00915v2[cs. CV]», May 12, 2017, 14 pages.

* cited by examiner

FIG. 1 (PRIOAR ART)

SYSTEMS AND METHODS FOR IMAGE SEGMENTATION USING A SCALABLE AND COMPACT CONVOLUTIONAL NEURAL NETWORK

CROSS REFERENCE TO RELATED APPLICATIONS

The present application is a continuation of U.S. application Ser. No. 16/159,573, filed Oct. 12, 2018, which claims the benefits of priority to U.S. Provisional Application No. 62/578,907, filed Oct. 30, 2017, both of which are incorporated herein by reference in their entireties.

TECHNICAL FIELD

The present disclosure relates to systems and methods for medical image segmentation, and more particularly to, systems and methods for medical image segmentation using a multi-level learning network including a convolutional ladder.

BACKGROUND

Accurate segmentation of medical images is a key step in contouring during radiotherapy planning. Image segmentation is a process of partitioning a digital image into multiple segments. The goal of segmentation is to simplify and/or change the representation of an image into something that is more meaningful and easier to analyze. Image segmentation is typically used to locate objects and boundaries (lines, curves, etc.) in images. More precisely, image segmentation is a process of assigning a label to every pixel in an image such that pixels with the same label share certain characteristics. Image segmentation has been used for various applications, including locating tumors and other pathologies, measuring tissue volumes, diagnosis and study of anatomical structure, surgery planning, virtual surgery simulation, and intra-surgery navigation.

Image segmentation may be solved as a classification problem. Learning networks, such as Convolutional Neural Network (CNN) with powerful hierarchical architectures, have been applied to image segmentation to improve accuracy. For example, automatic classifications using CNN could significantly outperform conventional image segmentation methods, such as atlas-based segmentation, and shape-based segmentation.

Figure 1:
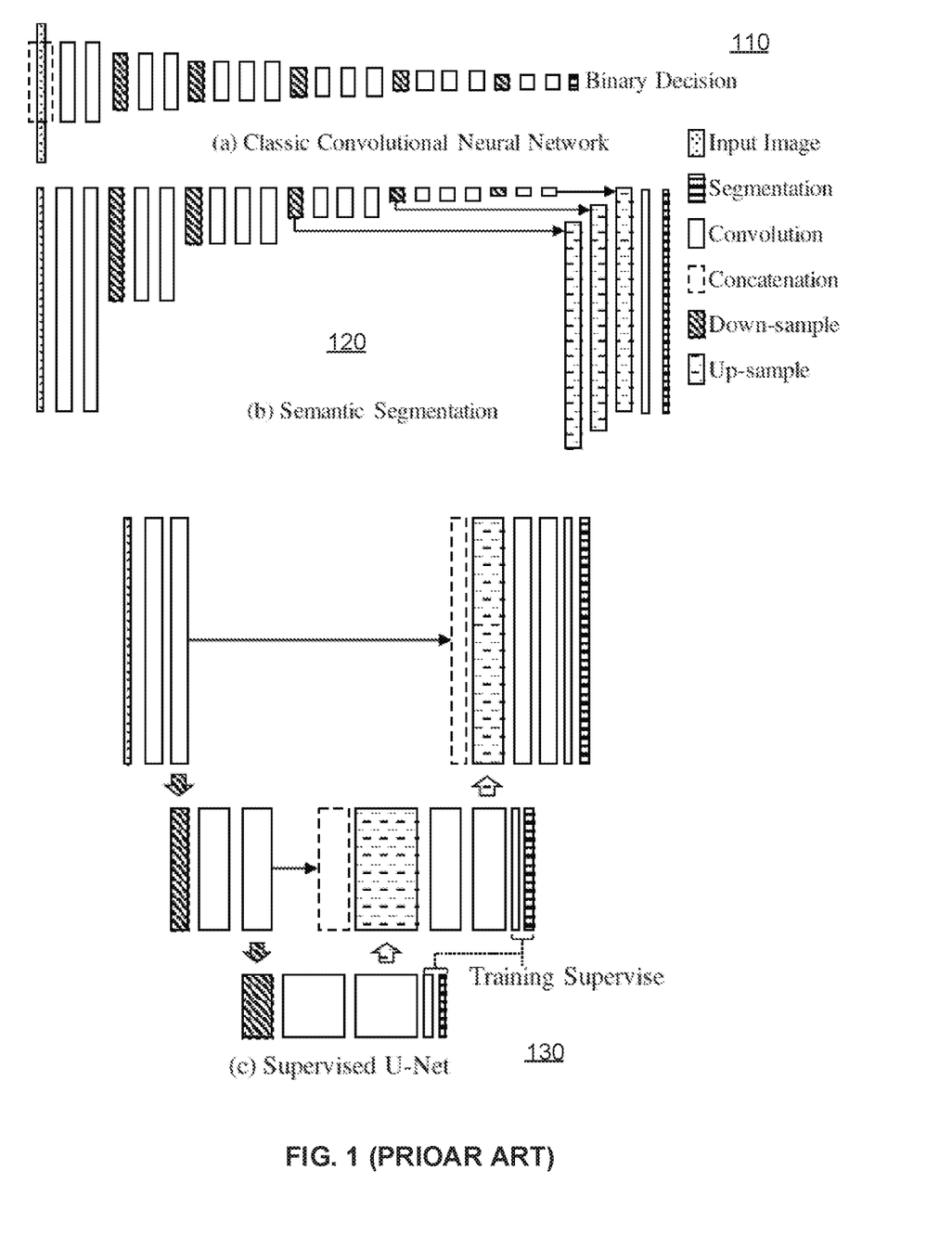
FIG. 1 illustrates exemplary prior art learning networks.

CNN was initially developed to classify images into different categories (e.g., digits in scanned post codes, or cats versus dogs in social media photos). A CNN is usually composed by a cascade of convolutional layers and pooling layers followed by a cascade of fully connect layers. For example, FIG. 1(a) illustrates a CNN 110. Using CNN 110, Image segmentation can be performed by performing pixel/voxel classification using a sliding window approach over an entire image. However, the computational cost of such a method is prohibitive, especially for large images. A major part of the computational cost occurs because multiple patches must be explicitly produced and that each patch needs to perform forward prediction operation separately.

To solve the expensive computational problem, fully convolutional network (FCN) was introduced. In an FCN, decision layers (multiple layer perceptron) also utilize convolution operation. Thus, algorithm can slide the convolution kernel on the whole image to generate the final image segmentation. For example, FIG. 1(b) illustrates an FCN 120 for semantic segmentation. Notably, in these methods, pooling layers are usually required to increase receptive fields to obtain context information which also reduce the spatial resolution of successive layers at the same time. To ensure that the output segmentation has the same resolution as the input source, up sampling is usually performed. This can be done with an interpolation algorithm or transpose convolution. However, over-smoothed boundary is inevitable due to the loss in spatial information.

To take advantage of FCN's speed and avoid the loss in boundary accuracy, low spatial resolution feature maps may be successively up-sampled like a convolutional auto decoder and concatenated with previously generated feature maps having the same resolution. The up-sampled global features may help to ensure the overall accuracy of the segmentation, and the concatenated local features may help to refine the segmentation and preserve a sharp boundary. Since this network architecture forms a "U" shape, it may be referred to as a U-Net. For example, FIG. 1(c) illustrates a supervised U-Net 130. To make the network more trainable to segment sparsely distributed objects, deeply supervised network with multiple loss functions may also be introduced such that the network may generate segmentation based on features in different spatial resolutions. Although U-Net and its related methods offer high accuracy, they are still time consuming to process the whole image segmentation when it comes to large 3D medical images such as lung CT scans.

Embodiments of the disclosure address the above problems by systems and methods for segmenting a medical image using a multi-level learning network that includes a convolutional ladder.

SUMMARY

Embodiments of the disclosure provide a system for segmenting an image. Embodiments of the disclosure provide systems and methods for segmenting an image. An exemplary system includes a communication interface configured to receive the image acquired by an image acquisition device. The system further includes a memory configured to store a multi-level learning network comprising a plurality of convolution blocks cascaded at multiple levels. The system also includes a processor configured to apply a first convolution block and a second convolution block of the multi-level learning network to the image in series. The first convolution block is applied to the image and the second convolution block is applied to a first output of the first convolution block. The processor is further configured to concatenate the first output of the first convolution block and a second output of the second convolution block to obtain a feature map and obtain a segmented image based on the feature map Embodiments of the disclosure also provide a method for segmenting an image. The method includes receiving, by a communication interface, the image acquired by an image acquisition device. The method further includes retrieving a multi-level learning network comprising a plurality of convolution blocks cascaded at multiple levels. The method also includes applying, by a processor, a first convolution block and a second convolution block of the multi-level learning network to the image in series. The first convolution block is applied to the image and the second convolution block is applied to a first output of the first convolution block. In addition, the method includes concatenating, by the processor, the first output of the first convolution block and a second output of the second convolution block to obtain a feature map and obtaining a segmented image based on the feature map.

Embodiments of the disclosure further provide another method for segmenting an image. The method includes receiving, by a communication interface, the image acquired by an image acquisition device. The method further includes retrieving a multi-level learning network comprising a plurality of convolution blocks cascaded at multiple levels. The method also includes serially applying, by a processor, the convolution blocks of levels previous to a current level in the multi-level learning network to obtain a current level feature map and determining a current level segmented image based on the current level feature map. The method yet further includes determining, by the processor, an improvement of the current level segmented image exceeds a threshold. In addition, the method includes applying, by the processor, the convolution block of a level next to the current level to an output from the convolution block of the current level, concatenating an output of the next level convolution block with the current level feature map to obtain a next level feature map, and obtaining a next level segmented image based on the next level feature map.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 2:
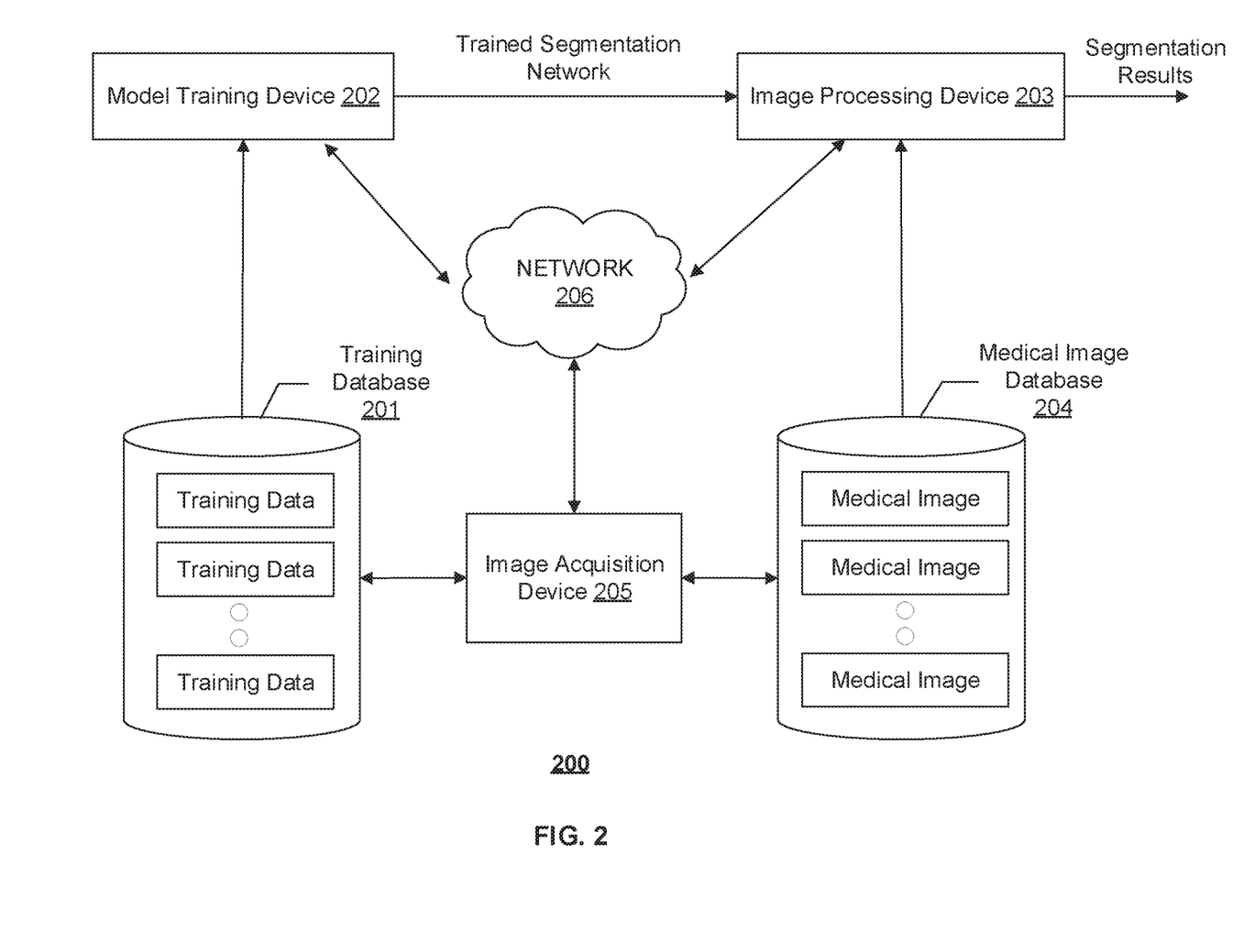
FIG. 2 illustrates a schematic diagram of an exemplary image segmentation system, according to embodiments of the disclosure.

FIG. 2 illustrates an exemplary image segmentation system 200, according to some embodiments of the present disclosure. Consistent with the present disclosure, image segmentation system 200 is configured to segment a medical image acquired by an image acquisition device 205. Consistent with the present disclosure, image segmentation system 200 may receive medical images from image acquisition device 205. Alternatively, medical images may be stored in an image database, such as medical image database 204, first and image segmentation system 200 may receive medical images from the image database. In some embodiments, medical images may be two-dimensional (2D) or three-dimensional (3D) images. A 3D image may contain multiple 2D image slices.

In some embodiments, image acquisition device 205 may acquire medical images using any suitable imaging modalities, including, e.g., functional MM (e.g., fMRI, DCE-MRI and diffusion MM), Cone Beam CT (CBCT), Spiral CT, Positron Emission Tomography (PET), Single-Photon Emission Computed Tomography (SPECT), X-ray, optical tomography, fluorescence imaging, ultrasound imaging, and radiotherapy portal imaging, etc.

For example, image acquisition device 205 may be an MM scanner. The MM scanner includes a magnet that surrounds a patient tube with a magnetic field. A patient is positioned on a padded table that can move into the patient tube. The MRI scanner further includes gradient coils in multiple directions (e.g., x, y, and z directions) to create a spatially varying magnetic field on top of the uniform magnetic field created by the magnet. The intensity of the uniform magnetic field used by the MRI scanner is typically between 0.2 T-7 T, e.g., around 1.5 T or 3 T. The MRI scanner also includes RF coils to excite tissues inside the patient body and transceivers to receive electromagnetic signals generated by the tissues while returning to an equilibrium state.

As another example, image acquisition device 205 may be a CT scanner. The CT scanner includes an X-ray source that emits X-rays against body tissues and a receiver that receives the residual X-rays after attenuated by the body tissues. The CT scanner also includes rotating mechanism to capture X-ray images at different view angles. Such rotating mechanism can be a rotating table that rotates the patient, or a rotating structure that rotates the X-ray source and the receiver around the patient. The X-ray images at different angles are then processed by a computer system to construct a two-dimensional (2D) cross section image or a three-dimensional (3D) image.

As shown in FIG. 2, image segmentation system 200 may include components for performing two stages, a training stage and a segmentation stage. To perform the training stage, image segmentation system 200 may include a training database 201 and a model training device 202. To perform the segmentation stage, image segmentation system 200 may include an image processing device 203 and/or a medical image database 204. In some embodiments, image segmentation system 200 may include more or less of the components shown in FIG. 2. For example, when a segmentation network for segmenting the medical images is pre-trained and provided, image segmentation system 200 may omit training database 201 and model training device 202, e.g., including only image processing device 203 and medical image database 204. As another example, when medical image database 204 is a third-party database or located remotely from image processing device 203, image segmentation system 200 may include just image processing device 203.

Image segmentation system 200 may optionally include a network 206 to facilitate the communication among the various components of image segmentation system 200, such as databases 201 and 204, devices 202, 203, and 205. For example, network 206 may be a local area network (LAN), a wireless network, a cloud computing environment (e.g., software as a service, platform as a service, infrastructure as a service), a client-server environment, a wide area network (WAN), the Internet, etc. In some embodiments, network 206 may be replaced by wired data communication systems or devices.

In some embodiments, the various components of image segmentation system 200 may be remote from each other or in different locations, and be connected through network 206 as shown in FIG. 2. In some alternative embodiments, certain components of image segmentation system 200 may be located on the same site or inside one integrated device. For example, training database 201 may be located on-site with or be part of model training device 202. As another example, model training device 202 and image processing device 203 may be inside the same computer or processing device.

As shown in FIG. 2, model training device 202 may communicate with training database 201 to receive one or more sets of training data. Each set of training data may include a medical image and its corresponding label map, served as ground truth, that provides the segmentation result to each of the pixels of the image. Training images stored in training database 201 may be obtained from a medical image database containing previously acquired medical images. The training images can be 2-D or 3-D images. The training images may be previously segmented with each pixel/voxel classified and labeled, e.g., with value 1 if the pixel/voxel corresponds to an object of interest (e.g. cancer) or value 0 if the pixel/voxel corresponds to background (e.g. non-cancer).

Model training device 202 may use the training data received from training database 201 to train a segmentation network for segmenting a medical image received from, e.g., image acquisition device 205, or medical image database 204. Model training device 202 may be implemented with hardware specially programmed by software that performs the training process. For example, model training device 202 may include a processor and a non-transitory computer-readable medium. The processor may conduct the training by performing instructions of a training process stored in the computer-readable medium. Model training device 202 may additionally include input and output interfaces to communicate with training database 201, network 206, and/or a user interface (not shown). The user interface may be used by a user for selecting sets of training data, adjusting one or more parameters of the training process, selecting or modifying a framework of the learning network, and/or manually or semi-automatically providing detection results associated with an image for training.

As used herein, "training" a learning network refers to determining one or more parameters of at least one layer in the learning network. For example, a convolutional layer of a CNN model may include at least one filter or kernel. One or more parameters, such as kernel weights, size, shape, and structure, of the at least one filter may be determined by e.g., a back propagation-based training process. Consistent with the present disclosure, a multi-level learning network may be trained by model training device 202 using the training data.

Consistent with the present disclosure, the segmentation network used for segmenting medical images may be a machine learning network such as a multi-level learning network. The segmentation network may be trained using supervised learning. The architecture of the segmentation network includes a stack of distinct blocks and layers that transform one or more inputs into one or more outputs. Examples of the different layers may include one or more convolution layers or fully-convolutional layers, non-linear operator layers, pooling or subsampling layers, fully connected layers, and/or final loss layers. Each layer may connect one upstream layer and one downstream layer.

Consistent with the present disclosure, the segmentation network may include a convolution ladder comprising multiple convolution blocks cascaded to generate feature maps of different levels (resolutions). The convolutional ladder based segmentation network disclosed in the present disclosure is compact and efficient in that: 1) it simplifies the decoder path with multiresolution feature fusion, 2) it reduces the number of parameters used in the network, and 3) it keeps spatial resolution during convolution. In some embodiments, the convolutional ladder based network architecture is also scalable. In some embodiments, because segmentation results can be generated in multiple resolutions, a user can control the convolutional ladder depth by stopping early when the desired segmentation result is reached. As a result, the disclosed segmentation network may significantly reduce the running time without sacrificing the accuracy.

Figure 3:
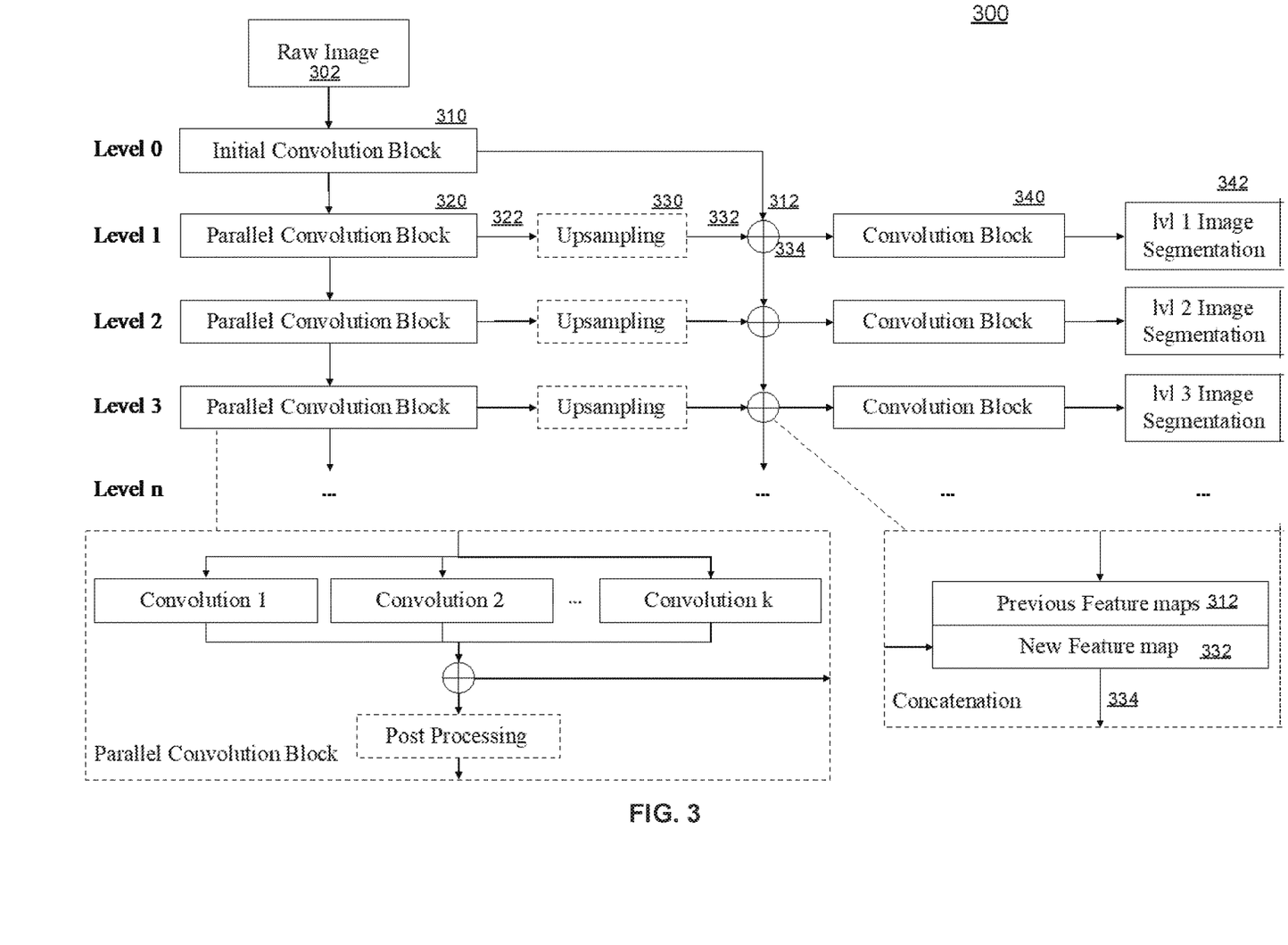
FIG. 3 illustrates an exemplary multi-level learning network for segmenting a medical image, according to embodiments of the disclosure.

For example, FIG. 3 illustrates an exemplary multi-level learning network 300 for segmenting a medical image, according to embodiments of the disclosure. In some embodiments, multi-level learning network 300 includes convolution blocks cascaded at different levels. For example, multi-level learning network 300 has an initial convolution block 310 at level-0, connected with a parallel convolution block 320 at level-1, which is further connected with a series of parallel convolution blocks at level-2, level-3, . . . , level-n.

In some embodiments, multi-level learning network 300 uses multi-resolution feature fusion. For example, the feature map at each level is catenated with the feature map at the previous level, to generate segmentation results at that level. In conventional networks, such as U-Net, half of the computation is dedicated to the decoding network which may successively fuse features in different resolutions to recover the spatial resolution and simultaneously conduct prediction for output segmented image. In common segmentation tasks such as segmenting a cat from camera scene, high level global features with larger receptive field is more critical than local features to make the correct prediction. Thus, such decoding network can be important and inevitable to perform correct prediction while recovering the spatial resolution. For medical image segmentation task, however, local image features can be as important as global features. For instance, in a CT image, the intensity at each local voxel is defined by Hounsfield unit (HU) scale such that the radiodensity of distilled water is 0 HU and the radiodensity of air is −1000 HU. To coarsely mask pure air in CT image, one can threshold the image with a value slightly higher than −1000 HU. Therefore, the disclosed multi-level learning network fuses the features in different scales and resolutions to save the computational cost.

In some embodiments, feature maps at different levels can be successively extracted in the segmentation network (e.g., a CNN). These features can be directly concatenated pixel-wisely and the final decision can be made by fusing them with an additional convolution block. In some embodiments, the concatenation can be generally performed in the original spatial resolution and the following convolutional block may preserve spatial resolution such that the output segmented image has the same resolution as the input image. If the spatial resolution of a feature map is lower than original image due to pooling or other procedures, the spatial resolution of that feature map may be up sampled accordingly before concatenation. Up sampling can be performed, for example, by simple interpolation algorithms such as nearest neighbor, linear interpolation, b-spline interpolation, or by trained deconvolution layers. For example, as shown in FIG.

3, a level-0 feature map 312 may be generated by initial convolution block 310 based on a raw image 302, e.g., a medical image acquired by image acquisition device 205. A feature map 332 may be generated by parallel convolution block 320 (as feature map 322) based on level-0 feature map 312 and then up-sampled by up-sampling block 330. Level-0 feature map 312 and feature map 332 are catenated to generate level-1 feature map 334.

In some embodiments, each parallel convolution block, e.g., parallel convolution block 320, may include multiple convolution layers arranged in parallel with each other. For example, FIG. 3 shows k convolution layers in each parallel convolution block. In some embodiment, the input feature map, e.g., level-0 feature map 312, may be distributed to the different convolution layers to generate multiple intermediate feature maps in parallel. In some embodiments, the output intermediate feature maps of these layers may be concatenated to generate a new convolutional feature map, such as feature map 322. It is contemplated, however, the convolution layers can have different configurations such that the image features can be extracted and fused in different levels.

In a conventional CNN, the number of feature map filters in the segmentation network may be successively increased, as at each level, an extra unit is required to "memorize" useful low-level features and deliver the information to none-adjacent layers. The increased number of filters may significantly increase the number of parameters in the network, and thus increase the computational complexity. For instance, given a convolution layer that takes 512 feature maps as input and output 1024 feature maps, the number of parameters required is 512 ×1024×K where K is the size of kernel. The number of parameters is 512 times more than a convolutional layer that takes 32 feature maps as input and output 32 feature maps. Because the disclosed segmentation network combines all the feature maps when conducting prediction, it will not be necessary to have an extra unit to deliver low level features to none-adjacent layers. In some embodiments, the high-level image features in some segmentation tasks (such as medical image segmentation) are not too complicated and the same number of feature maps can be used for each convolutional block for those tasks.

Figure 4:
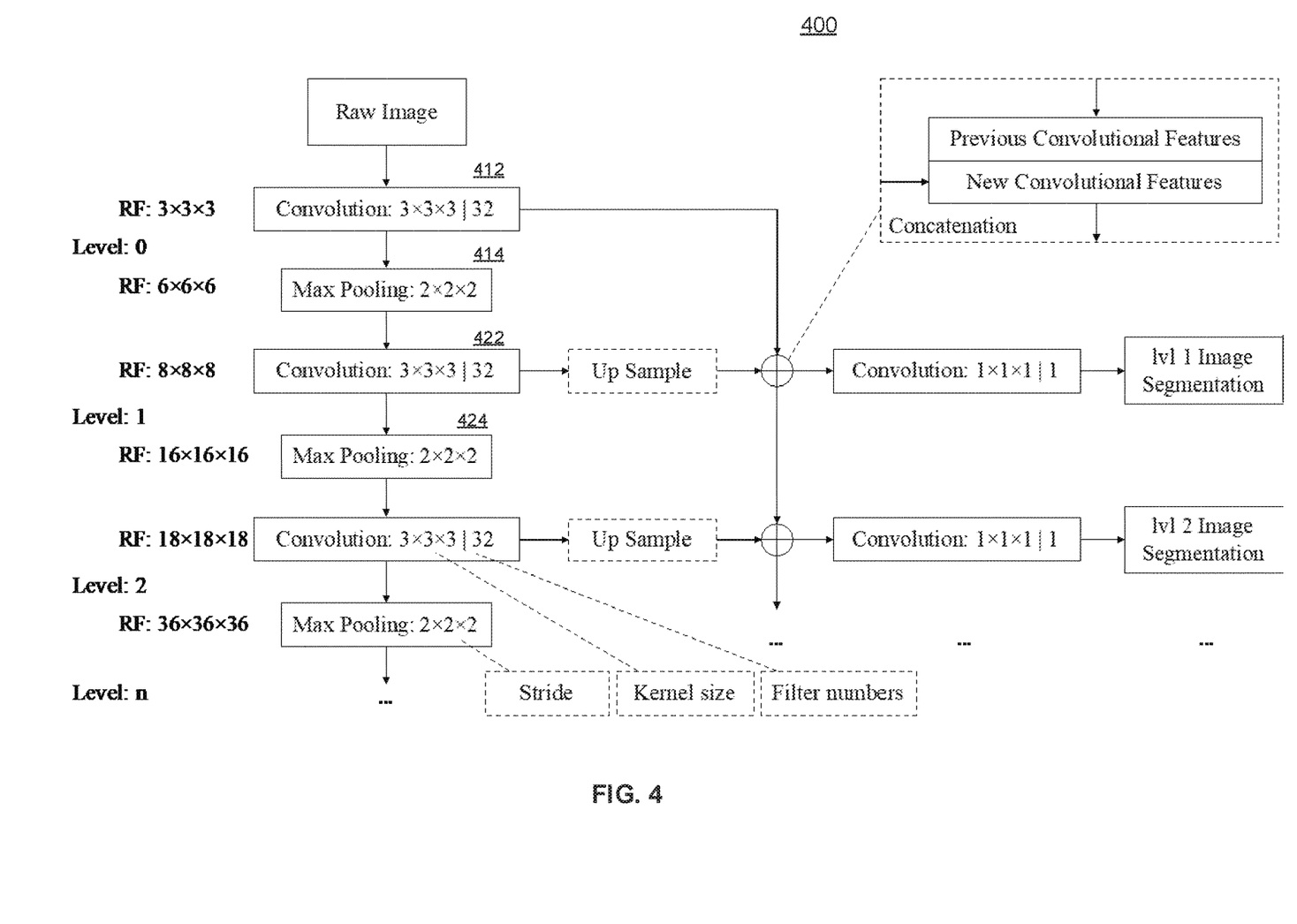
FIG. 4 illustrates an exemplary multi-level learning network that includes a pooling layer in each convolution block, according to embodiments of the disclosure.

In some embodiments, pooling layers may be introduced to the convolutional neural network and positioned between convolution layers to down sample the image. Utilizing pooling layers in this manner may increase the receptive field for successive convolution layers, eliminate redundant spatial features, and drive the network to learn hierarchical information (from local to global). For example, FIG. 4 illustrates an exemplary multi-level learning network 400 that includes a pooling layer in each convolution block, according to embodiments of the disclosure. For example, the initial convolution block may include a convolution layer 412 and a max pooling layer 414. Each of the subsequent parallel convolution blocks may include a convolution layer 422 and a max pooling layer 424. As shown in the example of FIG. 4, convolution layers 412 and 422 may use 32 filters with convolution kernels of 3×3×3 in size. Max pooling layers 414 and 424 may have a stride of 2 in each dimension. As a result, the receptive fields of the layers at the respective levels are 3×3×3 (convolution layer 412), 6×6×6 (max pooling layer 414), 8×8×8 (convolution layer 422), 16×16×16 (max pooling layer 424), 18×18×18 (level-2 convolution layer), and 36×36×36 (level-2 max pooling layer), which continue to increase over the successive layers.

Figure 5:
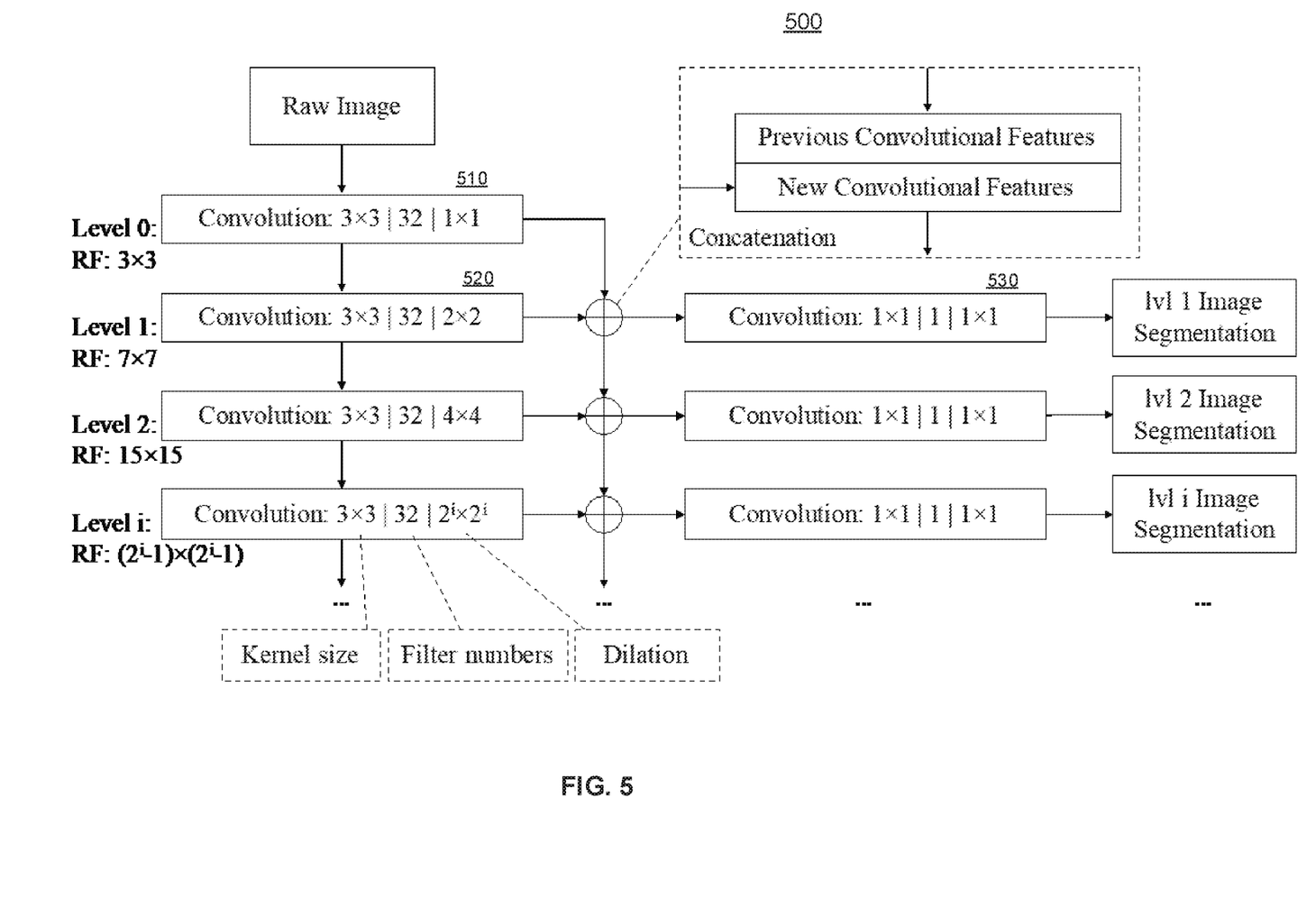
FIG. 5 illustrates an exemplary multi-level learning network that includes a dilated convolution layer in each convolution block, according to embodiments of the disclosure.

In some other embodiments, atrous convolution, instead of pooling layers, may be utilized to increase the receptive field. Consistent with the present disclosure, an atrous convolution may be a convolution with holes or a dilated convolution. This operation may enlarge the receptive field of convolution without introducing extra parameters. If the parameters are selected properly, the size of receptive field can increase exponentially with the number of convolutional layers cascaded in a sequence. For example, FIG. 5 illustrates an exemplary multi-level learning network 500 that includes a dilated convolution layer in each convolution block, according to embodiments of the disclosure. For example, the initial convolution block may include a dilated convolution layer 510, which uses 32 filters of 3×3 kernel size and a 1×1 dilation. Each of the subsequent parallel convolution blocks includes a dilated convolution layer 520, which uses 32 filters with convolution kernels of 3×3 in size and a $2^i \times 2^i$ dilation. For example, at level-1, the dilation is 2×2. Accordingly, the receptive field of a layer is 2×2 at level-0 and $(2^i-1) \times (2^i-1)$ at subsequent level-i, that is, 7×7 at level-1, 15×15 at level-2, etc. The receptive fields of the layers at the respective levels continue to increase as well.

Referring back to FIG. 2, image processing device 203 may receive the segmentation network, e.g., multi-level learning network 300/400/500, from model training device 202. Image processing device 203 may include a processor and a non-transitory computer-readable medium (discussed in detail in connection with FIG. 6). The processor may perform instructions of an image segmentation process stored in the medium. Image processing device 203 may additionally include input and output interfaces (discussed in detail in connection with FIG. 6) to communicate with medical image database 204, network 206, and/or a user interface (not shown). The user interface may be used for selecting a medical image for segmentation, initiating the segmentation process, displaying the medical image and/or the segmentation results.

Image processing device 203 may communicate with medical image database 204 to receive one or more medical images. In some embodiments, the medical images stored in medical image database 204 may include medical image of one or more imaging modalities. The medical images may be acquired by image acquisition devices 205, such as an MRI scanner and a CT scanner. Image processing device 203 may use the trained segmentation network received from model training device 202 to predict whether each pixel (if 2-D) or voxel (if 3-D) of the medical image corresponds to an object of interest, and output a segmented image.

In some embodiments, image processing device 203 may apply multi-level learning network 300 to raw image 302. At level-0, image processing device 203 may determine a level-0 feature map 312 by applying initial convolution block 310. At level-1, image processing device 203 may determine a feature map 322 by applying parallel convolution block 320 to level-0 feature map 312. If feature map 322 has a spatial resolution lower than raw image 302, image processing device 203 may up-sample feature map 322 using up-sampling block 330 to obtain feature map 332 that has the same spatial resolution as raw image 302. Image processing device 203 may catenate feature map 332 and level-0 feature map 312 to generate level-1 feature map 334. Image processing device 203 may apply another convolution block 340 on level-1 feature map 334 to obtain level-1 segmented image 342. In some embodiments, image processing device 203 may continue down the "convolution ladder" to apply successive parallel convolution blocks and obtain segmented images at different levels, in a manner similar to described above for obtaining level-1 segmented image 342.

In some embodiments, the segmentation network may be scalable when applied by image processing device 203 to obtain the segmented image. In some embodiments, as the segmentation network can successively return segmented images of different levels, image processing device 203 may decide to stop the network early when the segmented image at a particular level is sufficiently good. In some embodiments, the decision may be based on calculation of predetermined parameters associated with the segmented image. For example, image processing device 203 may determine that the difference between level-i segmented image and level-(i+1) segmented image is smaller than a threshold. In some embodiments, the segmented images at different levels may be displayed to a user and the user may manually stops further application of the segmentation network.

In some embodiments, the number of levels in the segmentation network may be predetermined and set by model training device 202. For example, model training device 202 can decide the size of network based on testing before providing the segmentation network to image processing device 203. For instance, if the segmentation output of certain level is sufficiently good and cannot be further improved by the later levels, the later levels can be discarded in the segmentation network. As another example, if the segmented image of a lower level does not provide a reasonable performance, the related convolution block can be eliminated in the segmentation network as well.

Figure 6:
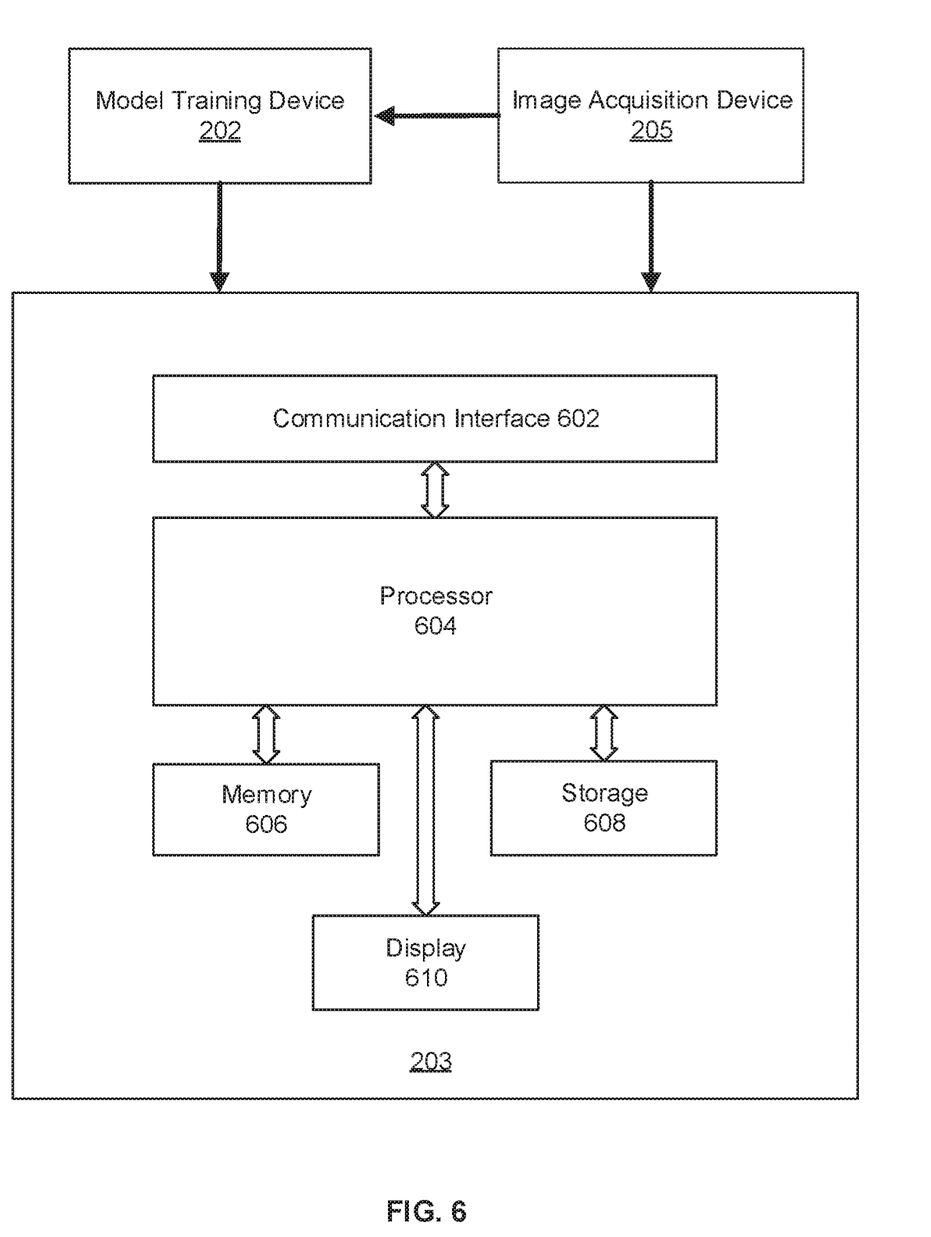
FIG. 6 illustrates a block diagram of an exemplary image processing device, according to embodiments of the disclosure.

FIG. 6 illustrates an exemplary image processing device 203, according to some embodiments of the present disclosure. In some embodiments, image processing device 203 may be a special-purpose computer, or a general-purpose computer. For example, image processing device 203 may be a computer custom-built for hospitals to perform image acquisition and image processing tasks. As shown in FIG. 6, image processing device 203 may include a communication interface 602, a processor 604, a memory 606, a storage 608, and a display 610.

Communication interface 602 may include a network adaptor, a cable connector, a serial connector, a USB connector, a parallel connector, a high-speed data transmission adaptor, such as fiber, USB 3.0, thunderbolt, and the like, a wireless network adaptor, such as a WiFi adaptor, a telecommunication (3G, 4G/LTE and the like) adaptor, etc. Image processing device 203 may be connected to other components of image segmentation system 200 and network 206 through communication interface 602. In some embodiments, communication interface 602 receives medical image from image acquisition device 205. For example, image acquisition device 205 is an MRI scanner or a CT scanner. In some embodiments, communication interface 602 also receives the segmentation network, e.g., multi-level learning network 300/400/500, from modeling training device 202.

Processor 604 may be a processing device that includes one or more general processing devices, such as a microprocessor, a central processing unit (CPU), a graphics processing unit (GPU), and the like. More specifically, the processor may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor may also be one or more dedicated processing devices such as application specific integrated circuits (ASICs), field programmable gate arrays (FPGAs), digital signal processors (DSPs), system-on-chip (SoCs), and the like. Processor 604 may be communicatively coupled to memory 606 and configured to execute the computer-executable instructions stored thereon, to perform an exemplary image segmentation process, such as that will be described in connection with FIG. 7.

Memory 606/storage 608 may be a non-transitory computer-readable medium, such as a read-only memory (ROM), a random access memory (RAM), a phase-change random access memory (PRAM), a static random access memory (SRAM), a dynamic random access memory (DRAM), an electrically erasable programmable read-only memory (EEPROM), other types of random access memories (RAMs), a flash disk or other forms of flash memory, a cache, a register, a static memory, a compact disc read-only memory (CD-ROM), a digital versatile disc (DVD) or other optical storage, a cassette tape or other magnetic storage devices, or any other non-transitory medium that may be used to store information or instructions capable of being accessed by a computer device, etc.

In some embodiments, storage 608 may store the trained network(s), e.g., multi-level learning network 300/400/500 and data, such as raw medical images, extracted image features (e.g., level-i feature maps, intermediate feature maps), received, used or generated while executing the computer programs, etc. In some embodiments, memory 606 may store computer-executable instructions, such as one or more image processing programs.

In some embodiments, processor 604 may render visualizations of segmented images and/or other data on a display 610. Display 610 may include a Liquid Crystal Display (LCD), a Light Emitting Diode Display (LED), a plasma display, or any other type of display, and provide a Graphical User Interface (GUI) presented on the display for user input and image/data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

Consistent with the present disclosure, model training device 202 can have same or similar structures as image processing device 203. In some embodiments, model training device 202 includes a processor, among other components, configured to train the segmentation network using training images.

Figure 7:
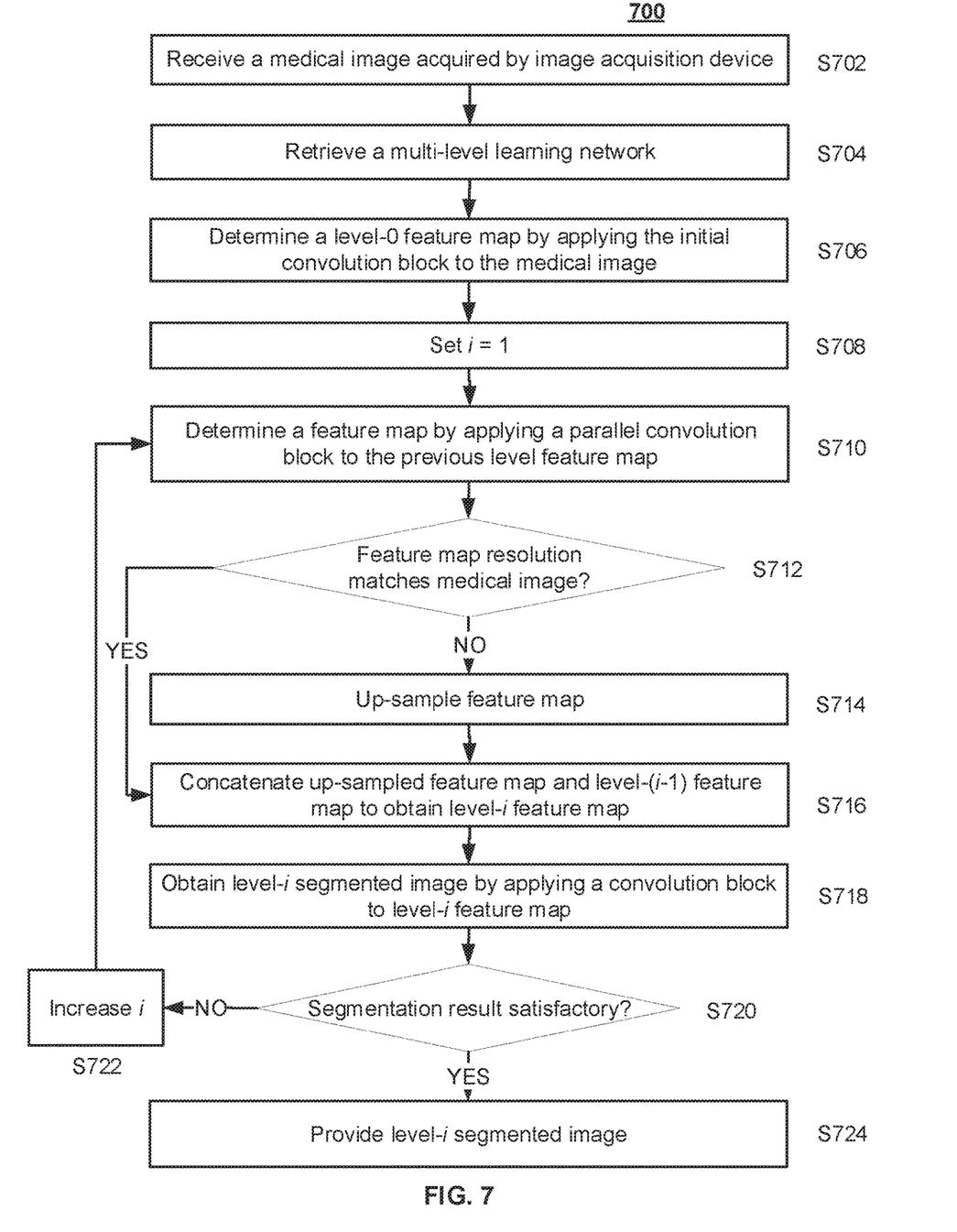
FIG. 7 shows a flow chart of an exemplary method for segmenting a medical image, according to embodiments of the disclosure.

FIG. 7 shows a flow chart of an exemplary method 700 for segmenting a medical image, according to embodiments of the disclosure. For example, method 700 may be implemented by image processing device 203 in FIG. 1. However, method 700 is not limited to that exemplary embodiment. Method 700 may include steps S702-S724 as described below. It is to be appreciated that some of the steps may be optional to perform the disclosure provided herein. Further, some of the steps may be performed simultaneously, or in a different order than shown in FIG. 7.

In step S702, image processing device 203 receives a medical image acquired by image acquisition device 205, e.g., from medical image database 204. The medical image can be of any imaging modality, such as MRI or CT. In step S704, image processing device 203 receives segmentation networks, e.g., multi-level learning network 300/400/500. For example, the segmentation network may be trained by model training device 202.

In step S706, image processing device 203 determines a level-0 feature map by applying an initial convolution block to the medical image. For example, in the embodiment shown by FIG. 3, image processing device 203 may apply multi-level learning network 300 to raw image 302. At level-0, image processing device 203 may determine level-0 feature map 312 by applying initial convolution block 310. In some embodiments, initial convolution block 310 may include convolution layer 412 and max pooling layer 414. In some other embodiments, initial convolution block 310 may include a dilated convolution layer 510.

In step S708, image processing device 203 sets level index i=1. In step S710, image processing device 203 may determine a feature map by applying a parallel convolution block to the previous level feature map. For example, as shown in FIG. 3, at level-1, image processing device 203 may determine a feature map 322 by applying parallel convolution block 320 to level-0 feature map 312. In some embodiments, parallel convolution block 320 may include convolution layer 422 and max pooling layer 424. In some other embodiments, parallel convolution block 320 may include a dilated convolution layer 520.

In some embodiments, the parallel convolution block, e.g., parallel convolution block 320, may include multiple convolution layers arranged in parallel with each other. For example, as shown in FIG. 3, parallel convolution block 320 includes k convolution layers configured in parallel and level-0 feature map 312 may be distributed to the k convolution layers to generate multiple intermediate feature maps, which may be concatenated to generate feature map 322.

In step S712, image processing device 203 determines if the spatial resolution of the feature map matches with that of the medical image being segmented. If the feature map has a spatial resolution lower than that of the medical image (S712: no), method 700 proceeds to step 714, where image processing device 203 may up-sample the feature map, e.g., using up-sampling block 330, to obtain a feature map that has the same spatial resolution as the medical image. Otherwise (S712: yes), method 700 proceeds directly to step S716.

In step S716, image processing device may catenate the up-sample feature map and level-(i−1) feature map to generate the level-i feature map. For example, as shown in FIG. 3, image processing device 203 may catenate feature map 332 and level-0 feature map 312 to generate level-1 feature map 334. In some embodiments, the pixel values of feature maps may be catenated pixel-by-pixel. For example, the corresponding pixel values in the feature maps may be added, averaged, or otherwise combined to generate pixel values of the catenated feature map.

In step S718, image processing device 203 may obtain level-i segmented image by applying another convolution block to the level-i feature map obtained in step S716. For example, as shown in FIG. 3, image processing device 203 may apply another convolution block 340 on level-1 feature map 334 to obtain level-1 segmented image 342.

In step S720, image processing device 203 may determine if the segmentation result obtained in step S718 is satisfactory. In some embodiments, image processing device 203 may calculate some predetermined parameters associated with the segmented image. For example, image processing device 203 may determine that the difference between level-i segmented image and level-(i−1) segmented image is smaller than a threshold, indicating that the improvement obtained by advancing a level is small enough that subsequent refinement may not be necessary. In this case, the segmentation result can be deemed satisfactory. If the segmentation result is satisfactory (S720: yes), image processing device 203 may decide to stop applying further levels of the segmentation network and provide the level-i segmented image as the final segmentation result in step S724. Otherwise (S720: no), method 700 proceeds to S722 to increase the level index i, and returns to step S710 where image processing device 203 continues down the "convolution ladder" to apply successive parallel convolution blocks and obtain segmented images at successive levels, by repeating steps S710-S720.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for segmenting an image, comprising:
  receiving, by a communication interface, the image acquired by an image acquisition device;
  retrieving a multi-level learning network comprising a plurality of convolution blocks cascaded at multiple levels;
  serially applying, by a processor, the convolution blocks of levels previous to a current level in the multi-level learning network to obtain a current level feature map;
  determining a current level segmented image based on the current level feature map;
  determining, by the processor, an improvement of the current level segmented image; and
  based on a comparison of the improvement with a threshold, stopping applying any additional convolution block in the multi-level learning network or applying, by the processor, the convolution block of a level next to the current level to an output from the convolution block of the current level.

2. The method of claim 1, further comprising:
  determining the improvement of the current level segmented image exceeds the threshold;
  applying the convolution block of the level next to the current level to an output from the convolution block of the current level;
  concatenating an output of the next level convolution block with the current level feature map to obtain a next level feature map; and
  obtaining a next level segmented image based on the next level feature map.

3. The method of claim 1, further comprising:
  determining the improvement of the current level segmented image is below the threshold; and
  stopping applying any additional convolution block in the multi-level learning network.

4. The method of claim 2, wherein applying the next level convolution block to the output of the current level convolution block further comprises:
- applying a plurality of convolution layers to the output of the current level convolution block in parallel to obtain respective intermediate feature maps; and
- determining the output of the next level convolution block by concatenating the intermediate feature maps.

5. The method of claim 2, further comprising:
- determining that a first spatial resolution of the output of the next level convolution block is different from a second spatial resolution of the current level feature map; and
- adjusting the output of the next level convolution block from the first spatial resolution to the second spatial resolution before concatenating with the current level feature map.

6. A system for segmenting an image, comprising:
- a communication interface configured to receive the image acquired by an image acquisition device;
- a memory configured to store a multi-level learning network comprising a plurality of convolution blocks cascaded at multiple levels; and
- a processor configured to:
  - apply a first convolution block and a second convolution block of the multi-level learning network to the image in series, wherein the first convolution block is applied to the image and the second convolution block is applied to a first output of the first convolution block;
  - concatenate the first output of the first convolution block and a second output of the second convolution block to obtain a feature map, wherein concatenating the first output and the second output includes combining values of the first output and the second output pixel b pixel; and
  - obtain a segmented image based on the feature map.

7. The system of claim 6, wherein the second convolution block includes a plurality of convolution layers connected in parallel, wherein the processor is further configured to:
- determine intermediate feature maps by applying respective parallel convolution layers to the first output of the first convolution block; and
- determine the second output of the second convolution block by concatenating the intermediate feature maps.

8. The system of claim 6, wherein the first output of the first convolution block has a first spatial resolution, wherein the processor is further configured to:
- down-sample the first output from the first spatial resolution to a second spatial resolution lower than the first spatial resolution; and
- determine the second output of the second convolution block in the second spatial resolution.

9. The system of claim 8, wherein the processor is configured to up-sample the second output from the second spatial resolution to the first spatial resolution before concatenating the first output with the second output.

10. The system of claim 8, wherein the first output of the first convolution block is down-sampled by applying a pooling layer or an atrous convolution.

11. The system of claim 6, wherein the processor is further configured to:
- continue to obtain a next level segmented image by applying a next level convolution block to an output from a current level convolution block until a difference between a current level segmented image and a previous level segmented image is smaller than a threshold.

12. The system of claim 11, wherein the next level convolution block is connected in series with the current level convolution block, wherein the processor is further configured to:
- obtain a next level feature map by concatenating an output from the next level convolution block with a current level feature map; and
- obtain the next level segmented image based on the next level feature map.

13. A method for segmenting an image, comprising:
- receiving, by a communication interface, the image acquired by an image acquisition device;
- retrieving a multi-level learning network comprising a plurality of convolution blocks cascaded at multiple levels;
- applying, by a processor, a first convolution block and a second convolution block of the multi-level learning network to the image in series, wherein the first convolution block is applied to the image and the second convolution block is applied to a first output of the first convolution block;
- concatenating, by the processor, the first output of the first convolution block and a second output of the second convolution block to obtain a feature map, wherein concatenating the first output and the second output includes combining values of the first output and the second output pixel by pixel; and
- obtaining a segmented image based on the feature map.

14. The method of claim 13, wherein applying the second convolution block further comprises:
- applying a plurality of convolution layers to the first output of the first convolution block in parallel to obtain respective intermediate feature maps; and
- determining the second output of the second convolution block by concatenating the intermediate feature maps.

15. The method of claim 13, wherein the first output of the first convolution block has a first spatial resolution, wherein the method further comprises:
- down-sampling the first output from the first spatial resolution to a second spatial resolution lower than the first spatial resolution; and
- determining the second output of the second convolution block in the second spatial resolution.

16. The method of claim 15, further comprising up-sampling the second output from the second spatial resolution to the first spatial resolution before concatenating the first output with the second output.

17. The method of claim 13, further comprising continuing to obtain a next level segmented image by applying a next level convolution block to an output from a current level convolution block until a difference between a current level segmented image and a previous level segmented image is smaller than a threshold.

18. The method of claim 17, wherein continuing to obtain the next level segmented image further comprises:
- obtaining a next level feature map by concatenating an output from the next level convolution block with a current level feature map; and
- obtaining the next level segmented image based on the next level feature map.

\* \* \* \* \*